(12) United States Patent
Dai et al.

(10) Patent No.: US 9,689,979 B2
(45) Date of Patent: Jun. 27, 2017

(54) PULSE SIGNAL SETTING DEVICE, RADAR APPARATUS, METHOD AND PROGRAM OF SETTING PULSE SIGNAL

(71) Applicant: Furuno Electric Co., Ltd., Nishinomiya (JP)

(72) Inventors: Koji Dai, Nishinomiya (JP); Akira Okunishi, Nishinomiya (JP)

(73) Assignee: Furuno Electric Co., Ltd., Nishinomiya, Hyogo (JP)

( * ) Notice: Subject to any disclaimer, the term of this patent is extended or adjusted under 35 U.S.C. 154(b) by 332 days.

(21) Appl. No.: 14/397,477

(22) PCT Filed: Apr. 1, 2013

(86) PCT No.: PCT/JP2013/059848
§ 371 (c)(1),
(2) Date: Oct. 27, 2014

(87) PCT Pub. No.: WO2013/161517
PCT Pub. Date: Oct. 31, 2013

(65) Prior Publication Data
US 2015/0130654 A1 May 14, 2015

(30) Foreign Application Priority Data
Apr. 27, 2012 (JP) ................................. 2012-102603

(51) Int. Cl.
*G01S 13/08* (2006.01)
*G01S 13/58* (2006.01)
(Continued)

(52) U.S. Cl.
CPC .............. *G01S 13/581* (2013.01); *G01S 7/28* (2013.01); *G01S 13/22* (2013.01);
(Continued)

(58) Field of Classification Search
CPC ................................. G01S 13/581; G01S 7/28
(Continued)

(56) References Cited

U.S. PATENT DOCUMENTS 4,730,189 A * 3/1988 Siegel .................. G01S 7/2926
342/104
5,963,677 A * 10/1999 Schrick .................. G01S 7/021
342/137

(Continued)

FOREIGN PATENT DOCUMENTS

| JP | 62055583 A | 3/1987 |
|---|---|---|
| JP | 2003149327 A | 5/2003 |
| JP | 2006226954 A | 8/2006 |

OTHER PUBLICATIONS

ISA Japanese Patent Office, International Search Report of PCT/JP2013/059848, Apr. 11, 2013, WIPO, 2 pages.

*Primary Examiner* — Marcus Windrich
(74) *Attorney, Agent, or Firm* — Alleman Hall Creasman & Tuttle LLP

(57) ABSTRACT

A radar apparatus using a pulse pair method to quickly measure a relative speed of an object. The radar apparatus includes: A data acquirer that acquires data relating to a pulse width, a repetition frequency, and a highest staggered ratio; A staggered pattern output unit that outputs a specific staggered pattern in which a total of phase changes within a sweep range of the target of the pulse pairing can be approximated to zero, wherein each phase change is caused by the pulse pairing on a target object at a constant speed due to a difference between an average transmission interval and a transmission interval between transmissions within the sweep range; And a setter that sets the transmission interval of a pulse signal by using the pulse width, the repetition frequency, the highest staggered ratio, and the specific staggered pattern.

20 Claims, 7 Drawing Sheets

(51) Int. Cl.
*G01S 13/22* (2006.01)
*G01S 7/28* (2006.01)
*G01S 13/93* (2006.01)
*G01S 13/60* (2006.01)
*G01S 7/02* (2006.01)

(52) U.S. Cl.
CPC ........... *G01S 13/9307* (2013.01); *G01S 7/023* (2013.01); *G01S 13/60* (2013.01)

(58) Field of Classification Search
USPC .......................... 342/41, 104, 112, 159, 160
See application file for complete search history.

(56) References Cited

U.S. PATENT DOCUMENTS

| | | | | |
|---|---|---|---|---|
| 7,064,704 B2* | 6/2006 | Bergkvist | ................ | G01S 13/22 342/118 |
| 7,605,744 B1* | 10/2009 | Karhunen | ............... | G01S 13/22 342/112 |
| 7,728,765 B1* | 6/2010 | Gray | ..................... | G01S 7/2923 342/118 |
| 9,013,347 B2* | 4/2015 | Park | ....................... | G01S 13/325 342/104 |
| 2004/0252047 A1* | 12/2004 | Miyake | ................... | G01S 13/34 342/107 |
| 2007/0013580 A1* | 1/2007 | Finch | ................. | G01S 13/5246 342/160 |
| 2008/0100503 A1* | 5/2008 | Yanagi | .................... | G01S 7/064 342/176 |
| 2008/0136704 A1* | 6/2008 | Chan | ....................... | G01S 7/282 342/201 |
| 2010/0214157 A1* | 8/2010 | McEwan | ................. | G01S 13/18 342/173 |
| 2010/0289690 A1* | 11/2010 | Dai | ........................ | G01S 7/062 342/41 |

* cited by examiner

| (PRI NUMBER) | 1 | 2 | 3 | 4 | 5 | 6 | 7 | 8 | |
|---|---|---|---|---|---|---|---|---|---|
| NON-STAGGERED PRI PATTERN | 500 | 500 | 500 | 500 | 500 | 500 | 500 | 500 | (μS) |
| + | + | + | + | + | + | + | + | + | |
| STAGGERED INTERVAL PATTERN | -20 | 20 | -40 | 40 | -60 | 60 | -80 | 80 | (μS) |
| = | = | = | = | = | = | = | = | = | |
| STAGGERED PRI PATTERN | 480 | 520 | 460 | 540 | 440 | 560 | 420 | 580 | (μS) |

FIG. 5

PULSE SIGNAL SETTING DEVICE, RADAR APPARATUS, METHOD AND PROGRAM OF SETTING PULSE SIGNAL

TECHNICAL FIELD

This disclosure relates to a pulse signal setting device, which sets a transmission interval of a pulse signal repeatedly transmitted by a radar apparatus, relates to a radar apparatus, which includes such a pulse signal setting device, and relates to a method and a program of setting a pulse signal.

BACKGROUND ART

Radar apparatuses generally detect target objects (e.g., aircrafts and ships) by capturing reflection waves of discharged radio waves, and displays the detected target objects on a display screen. With radar apparatuses installed in, for example, ships, it is required to suppress influence of mutual interference between the radar apparatus of a ship concerned and the radar apparatus of another ship caused by a radio wave outputted from the other ship existing in the surroundings of the ship concerned. As one of methods of suppressing such influence of the mutual interference between the radar apparatuses, stagger triggering disclosed in, for example, Patent Document 1 (JP3561497B) is known. Staggering is for changing a transmission interval of a pulse signal based on an arbitrary pattern to avoid overlapping of reception timings of interference signals between sweeps.

Meanwhile, to prevent a collision accident between ships, it is important for an operator of the ship concerned to know the position of another ship existing in the surroundings of the ship concerned and an approaching speed of the other ship to the ship concerned. Here, the approaching speed indicates a radial element of a relative speed of the other ship to the ship concerned. As one of methods of calculating the approaching speed of the other ship, there is a pulse pair method (also referred to as self-correlation method). The pulse pair method is a method of calculating a complex self-correlation coefficient of a complex reception signal in a transmission cycle and, based on the result, calculating the approaching speed of the other ship. The pulse pair method can estimate the approaching speed in a shorter period of time compared to an echo trail function that displays a track of the other ship in an image, and Automatic Radar Plotting Aids (ARPA) that calculates the speed of the other ship based on signal intensities of reflection waves obtained in a plurality of scans.

DISCLOSURE OF THE INVENTION

Problems to be Solved by the Invention

However, the pulse pair method is a processing method used under a condition that a pulse signal is transmitted in a constant transmission cycle. Therefore, if the pulse pair method is applied to the complex reception signal obtained by the staggered triggering, a phase change amount in each transmission varies because a sampling timing shifts due to the staggering. Due to the variation of the phase change amount (phase error), an error occurs in an estimation value of the approaching speed of the other ship. Hereinafter, the error is simply referred to as the speed error.

This disclosure aims to accurately obtain a relative speed of a target object to a radar apparatus in a short period of time by using the pulse pair method.

SUMMARY OF THE INVENTION

For solving the above problems, a pulse signal setting unit is applied for a radar apparatus that performs pulse pairing on the complex reception signals by calculating phase change amounts for every predetermined number of sweeps, each complex reception signal obtained from a reflection wave caused by a transmitted pulse signal and reflected on a target object The pulse signal setting unit includes a setting module configured to set a plurality of set transmission timings, each timing different, by a predetermined period of time, from a reference transmission timing having a predetermined repetition cycle. The setting module sets the plurality of set transmission timings to cause phase change amounts of pulse signals transmitted at the plurality of set transmission timings to be substantially the same as phase change amounts of pulse signals transmitted at the reference transmission timings, for every predetermined number of sweeps.

Further, for solving the above problems, a pulse signal setting unit is applied for a radar apparatus that performs pulse pairing on complex reception signals for every predetermined number of sweeps, each complex reception signal obtained from a reflection wave caused by a transmitted pulse signal and reflected on a target object. The pulse signal setting unit includes a setting module configured to receive a reference transmission timing having a predetermined repetition cycle and set a plurality of set transmission timings, each set transmission timing different from the reference transmission timing by a predetermined period of time. The predetermined period of time is a period of time with which phase change amounts of pulse signals transmitted at the plurality of set transmission timings in the predetermined number of sweeps are substantially the same as phase change amounts of pulse signals transmitted at the reference transmission timings in the predetermined number of sweeps.

According to the pulse signal setting unit, the setting module sets the plurality of set transmission timings to cause the phase change amounts of the pulse signals transmitted at the plurality of set transmission timings to be substantially the same as the phase change amounts of the pulse signals transmitted at the reference transmission timings, for every predetermined number of sweeps. Therefore, a phase error in the pulse paring that occurs based on the phase change amounts for every predetermined number of sweeps can be substantially zero. As a result, regarding a speed estimated by the pulse paring, occurrence of a speed error due to the phase error can be suppressed.

The phrase "the setting module sets the plurality of set transmission timings to cause phase change amounts of pulse signals transmitted at the plurality of set transmission timings to be substantially the same as phase change amounts of pulse signals transmitted at the reference transmission timings, for every predetermined number of sweeps" can be restated as follows. That is, the setting module sets the period of time by which the set transmission timing is different from the reference transmission timing, to be a period of time with which the phase change amounts of the pulse signals transmitted at the plurality of set transmission timings in the predetermined number of sweeps are substantially the same as the phase change amounts of the pulse signals transmitted at the reference transmission timings in the predetermined number of sweeps.

For solving the above problems, a method of setting pulse signals is applied for a radar apparatus that performs pulse pairing on the complex reception signals by calculating phase change amounts for every predetermined number of sweeps, each complex reception signal obtained from a reflection wave caused by a transmitted pulse signal and reflected on a target object. The method includes setting a plurality of set transmission timings, each timing different, by a predetermined period of time, from a reference transmission timing having a predetermined repetition cycle. The setting the plurality of set transmission timings includes setting the plurality of set transmission timings to cause phase change amounts of pulse signals transmitted at the plurality of set transmission timings to be substantially the same as phase change amounts of pulse signals transmitted at the reference transmission timings for every predetermined number of sweeps.

According to the pulse signal setting method, in the setting the plurality of set transmission timings, the plurality of set transmission timings is set so that the phase change amounts of the pulse signals transmitted at the plurality of set transmission timings are substantially the same as the phase change amounts of the pulse signals transmitted at the reference transmission timings for every predetermined number of sweeps. Therefore, a phase error in the pulse paring that occurred based on the phase change amounts for every predetermined number of sweeps can be substantially zero. As a result, regarding a speed estimated by the pulse paring, occurrence of a speed error due to the phase error can be suppressed.

Effect of the Invention

According to this disclosure, regarding a speed estimated by the pulse paring, occurrence of a speed error due to a phase error can be suppressed, and a relative speed of a target object to a radar apparatus can be accurately obtained in a short period of time by using a pulse pair method.

BRIEF DESCRIPTION OF DRAWINGS

FIG. 4(A) is a conceptual view for describing one example of the staggered pattern, FIG. 4(B) is a conceptual view for describing a second example of the staggered pattern, FIG. 4(C) is a conceptual view for describing a third example of the staggered pattern, and FIG. 4(D) is a conceptual view for describing a fourth example of the staggered pattern.

FIG. 5 is a conceptual view illustrating a creating procedure of a transmission interval pattern using the staggered pattern.

MODE(S) FOR CARRYING OUT THE INVENTION

First Embodiment

Figure 1:
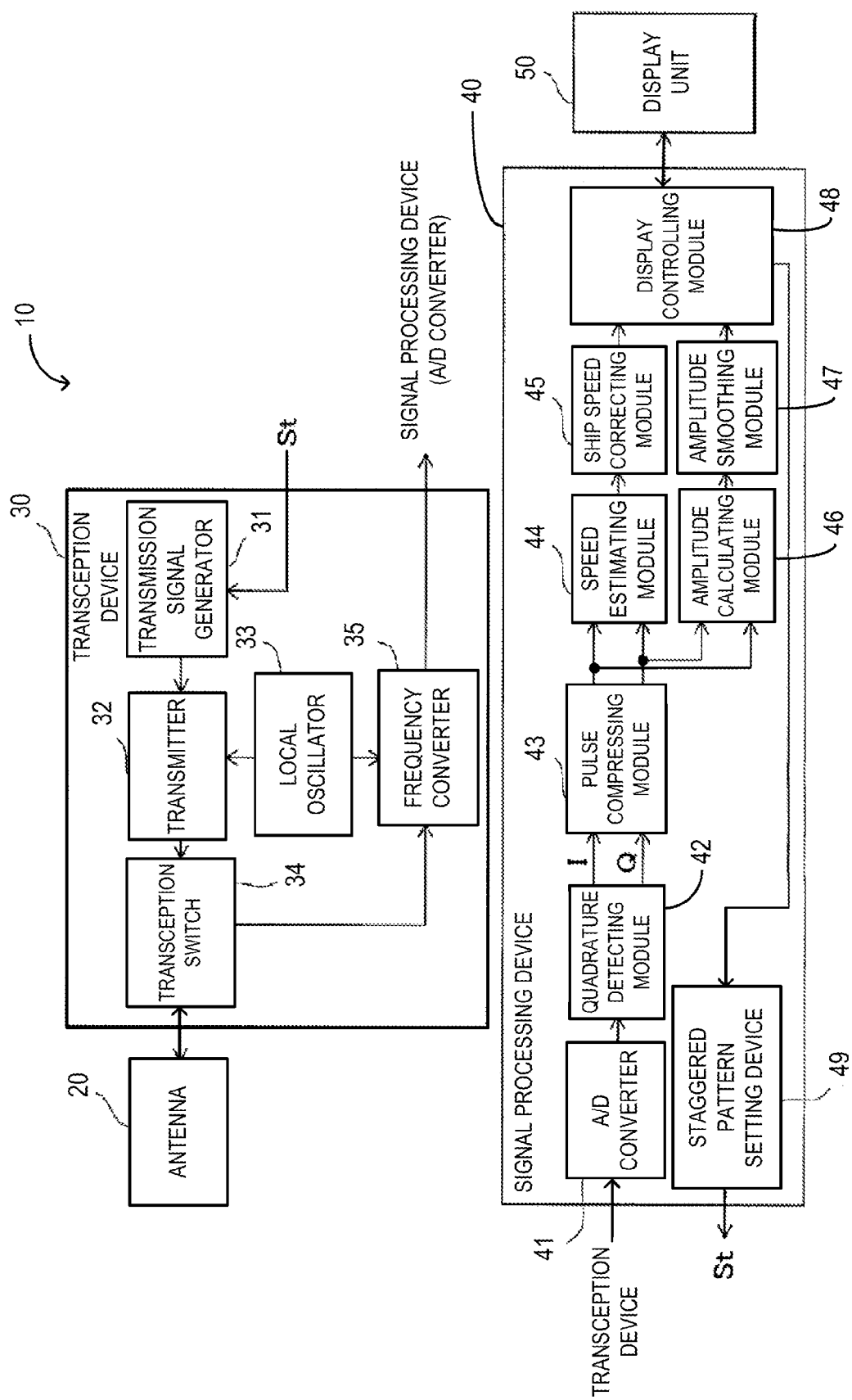
FIG. 1 is a block diagram illustrating a schematic configuration of a radar apparatus according to a first embodiment.

Hereinafter, a radar apparatus according to a first embodiment of this disclosure is described with reference to the drawings. FIG. 1 is a block diagram illustrating a schematic configuration of a ship radar apparatus. A radar apparatus 10 in FIG. 1 is provided, for example, in a ship and detects target objects, such as other ships and buoys on the sea and land. As illustrated in FIG. 1, the radar apparatus 10 includes an antenna 20, a transception device 30, a signal processing device 40, and a display unit 50.

Hereinafter, respective components configuring the radar apparatus 10 are described in detail. Here, the ship radar apparatus is described as an example of the radar apparatus; however, this disclosure can be applied to radar apparatuses that transmit a pulsed radio wave (pulse signal) and then receive a reception signal including a reflection wave (target object signal) of the pulsed radio wave from a target object, and also to radar apparatuses for other applications, such as weather radars and harbor surveillance radars. Such radar apparatuses include, not only solid-state radar apparatuses using a semiconductor amplifier as a transceiver, but also magnetron radar apparatuses.

Configuration of Antenna 20

With the radar apparatus 10, the antenna 20 transmits a beam of a pulse signal having a sharp directivity and receives a reflection wave from a target object existing in the surroundings of the antenna 20. The width of the beam is set to, for example, 2 degrees. The antenna 20 repeats the transmission and the reception while rotating in a horizontal plane. The rotational speed is, for example, 24 rpm. A unit of processing performed while the antenna 20 fully rotates once is referred to as a scan. Moreover, operation of the transmission and the reception in a period from a transmission of a pulse signal until immediately before the transmission of the next pulse signal is referred to as a sweep. A period of time of one sweep, in other words, an average transmission cycle (average transmission interval) is, for example, 1 ms. Further, an amount of reception data per sweep is referred to as the number of samples.

The antenna 20 receives a reception signal including the reflection wave from the target object (target object signal) by discharging the pulse signal intensively in a certain direction range. The reception signal may include, other than the target object signal element, an element of a wave caused by radio wave interference of clutter or another radar apparatus and an element of receiver noise.

A distance from the antenna 20 to the target object is obtained from a difference between a reception timing of the reception signal including the target object signal and a transmission timing of the pulse signal corresponding to the reception signal. Moreover, an azimuth of the target object is obtained from the azimuth of the antenna 20 when transmitting the corresponding pulse signal.

Configuration of Transception Device 30

The transception device 30 generates the pulse signal and transmits it to the antenna 20. Moreover, the transception device 30 receives the reception signal from the antenna 20 and converts the frequency of the reception signal. In this embodiment, the transception device 30 includes a transmission signal generator 31, a transmitter 32, a local oscillator 33, a transception switch 34, and a frequency converter 35.

The transmission signal generator 31 generates a pulse signal at a medium frequency and outputs it to the transmitter 32 at a different time interval. By generating the pulse signal at the medium frequency at the different time interval, the transmission interval of the pulse signal changes (staggered triggering). The transmission signal generator 31 generates the pulse signal at a time interval according to a setting signal St supplied from a staggered pattern setting device described later.

In this embodiment, the pulse signal generated by the transmission signal generator 31 is, for example, a frequency modulated signal known as a chirp signal; however, also in a case where the transmission signal generator 31 generates a phase modulated signal or a non-modulated pulse, the radar apparatus 10 can have a similar configuration. Note that, for example, the transmission interval and a pulse width W of the pulse signal generated by the transmission signal generator 31 are changeable according to a display distance range of a radar image set by the display unit 50, etc.

The transmitter 32 mixes the output signal of the transmission signal generator 31 with a local signal outputted from the local oscillator 33, and converts the frequency of the output signal of the transmission signal generator 31 and outputs it to the transception switch 34. A frequency band of the output signal of the transmitter 32 is, for example, either one of 3 GHz and 9 GHz.

The transception switch 34 is configured to be connectable with the antenna 20. The transception switch 34 switches the signal between the antenna 20 and the transception device 30. In other words, the transception switch 34 avoids the pulse signal from straying into the reception circuit (i.e., frequency converter 35) in transmission, and avoids the reception signal from straying into the transmission circuit (i.e., transceiver 32) in reception. As the transception switch 34, an electronic component, such as a circulator, is used.

The frequency converter 35 receives the reception signal outputted from the antenna 20 via the transception switch 34. Then, the frequency converter 35 mixes the reception signal with the local signal outputted from the local oscillator 33, converts the frequency of the output signal of the transception switch 34 into the medium frequency, and outputs it to the following signal processing device 40.

Note that, in the transception device 30 in FIG. 1, the illustration of an amplifier and a filter is omitted.

Configuration of Signal Processing Device 40

The signal processing device 40 converts the reception signal into a digital signal and processes it. Therefore, in this embodiment, the signal processing device 40 includes an A/D (Analog to Digital) converting module 41, a quadrature detecting module 42, a pulse compressing module 43, a speed estimating module 44, a ship speed correcting module 45, an amplitude calculating module 46, an amplitude smoothing module 47, a display controlling module 48, and a staggered pattern setting device 49. The signal processing device 40 or a part of the signal processing device 40 can be achieved by a digital circuit, such as an ASIC (Application Specific Integrated Circuit).

An A/D converting module 41 converts the medium frequency signal in an analog value outputted from the frequency converter 35 (transception device 30), into the digital signal.

The quadrature detecting module 42 performs a quadrature-detection on the medium frequency signal in the digital value outputted from the A/D converting module 41.

Specifically, the quadrature detecting module 42 generates an I (In-phase) signal and a Q (Quadrature) signal having a different phase from that of the I signal by $\pi/2$, from the reception data outputted from the A/D converting module 41. Here, the I signal and the Q signal (hereinafter, suitably abbreviated into "I" and "Q") are a real part and an imaginary part of a complex envelope signal of the reception data, respectively. Hereinafter, the complex envelope signal is simply referred to as a complex reception signal. The amplitude of the complex reception signal is expressed by $(I^2+Q^2)^{1/2}$, and the phase of the complex reception signal is expressed by $\tan^{-1}(Q/I)$.

The pulse compressing module 43 includes a Fourier converter, a matched filter, and an inverse Fourier converter, and performs pulse-compression processing an output signal (I, Q) from the quadrature detecting module 42. At the pulse compressing module 43, the output signal (I, Q) is Fourier-converted and discretized to be assigned into a plurality of spaces, and pulsed-compressed in a frequency range corresponding thereto. Then, the inverse Fourier-conversion and overlap-adding are performed thereon to calculate a pulse compressed signal. The pulse compressed signal is expressed by the I signal and the Q signal. Hereinafter, the pulse compression signal is treated as data (I+jQ) of a complex number. The data of the complex number is referred to as the reception data. The number of times transception is performed (=number of sweeps) per scan is K and the amount of reception data per sweep is N. The reception data sampled the n-th ($0 \le n \le N-1$) in a k-th ($0 \le k \le K-1$) sweep is expressed by S[k, n]. "k" corresponds to the antenna azimuth and "n" corresponds to the distance. Hereinafter, k is referred to as the azimuth number, and n is referred to as the distance number.

The speed estimating module 44 applies the pulse pair method to (performs pulse pairing on) the reception data S[k, n] ($0 \le k \le K-1$, $0 \le n \le N-1$) outputted from the pulse compressing module 43, to calculate a speed estimation value at each set of coordinates (k, n). Hereinafter, the speed estimation value is referred to as speed data and is expressed by V[k, n] ($0 \le k \le K-1$, $0 \le n \le N-1$). The pulse pair method is expressed by Equation 1. Note that, $\lambda$ expresses a wavelength of a transmission frequency, $PRI_{ave}$ expresses the average transmission interval when the azimuth number k is within a range of $k-(K_p-1) \le k \le k+(K_p-1)$, $K_p$ expresses a half processing data width of the pulse pair method, and arg[•] expresses an argument of the complex number. Note that, the average transmission interval $PRI_{ave}$ is given by an average value of intervals in the sweeps of the range $(k-(K_p-1) \le k \le k+(K_p-1))$ that is the target of the pulse pairing.

$$V[k, n] = \frac{\lambda}{4\pi \cdot PRI_{ave}} \cdot \arg\left[\sum_{m=k-(K_p-1)}^{k+(K_p-1)} S[m+1, n] \cdot S^*[m, n]\right] \quad (1)$$

The ship speed correcting module 45 performs ship speed correction processing on each speed data V[k, n] ($0 \le k \le K-1$, $0 \le n \le N-1$) outputted from the speed estimating module 44. For example, the speed data V[k, n] ($0 \le k \le K-1$, $0 \le n \le N-1$) is corrected based on an antenna rotational speed, a ship speed and the like at the respective timings, to calculate an absolute speed of the target object.

The amplitude calculating module 46 calculates an amplitude of each reception data S[k, n]. An amplitude value calculated by the amplitude calculating module 46 is referred to as amplitude data and is expressed by A[k, n] ($0 \le k \le K-1$, $0 \le n \le N-1$).

The amplitude smoothing module 47 performs moving average processing in the azimuth direction, on the amplitude data A[k, n] outputted from the amplitude calculating module 46. The data after the moving average processing is performed by the amplitude smoothing module 47 is referred to as smoothed amplitude data and is expressed by $A_s[k, n]$ ($0 \leq k \leq K-1$, $0 \leq n \leq N-1$). The moving average processing is expressed by the following equation. Note that, $k_s$ expresses a half processing data width of the moving average processing.

$$A_s[k, n] = \frac{1}{2K_s + 1} \sum_{m=k-K_P}^{k+K_P} A[\text{mod}(m, K), n]$$

Here, mod (m, k) means a remainder after dividing "m" by "k".

The display controlling module 48 performs amplitude threshold processing and speed threshold processing on the corrected speed data ($0 \leq k \leq K-1$, $0 \leq n \leq N-1$) outputted from the ship speed correcting module 45 and the smoothed amplitude data $A_s[k, n]$ ($0 \leq k \leq K-1$, $0 \leq n \leq N-1$).

The amplitude threshold processing is processing of recognizing data having a larger amplitude than a preset threshold as target object data. Therefore, data having a smaller amplitude than the threshold is determined as noise and removed from the target to be displayed. Moreover, the speed threshold processing is processing of recognizing, among the data recognized as likely being the target object in the amplitude threshold processing, data of which a length of a speed vector exceeds a predetermined threshold as a moving target. Therefore, data with lower speed than the threshold is determined as a fixed target object and removed from the target to be displayed.

The display controlling module 48 outputs, to the display unit 50, the data obtained by performing the amplitude threshold processing and the speed threshold processing, as the data of the moving target. The display unit 50 displays the moving target based on the data given from the display controlling module 48.

Moreover, the display unit 50 is configured to be able to receive a distance range measured by the radar apparatus 10 and a range, etc. The display controlling module 48 receives input data, such as the distance range and the range, from the display unit 50. The display controlling module 48 outputs a highest staggered ratio $J_{max}$, a repetition frequency PRF, and the pulse width W to the staggered pattern setting device 49, based on the input data from the display unit 50. In this specification, the highest staggered ratio $J_{max}$ is defined by a ratio of a longest staggered interval $\Delta T_{max}$ with the average transmission interval $PRI_{ave}$. Here, each of the staggered intervals is expressed by a difference between the transmission interval and the average transmission interval. For example, when a longest transmission interval $T_{max}$ is given by $PRI_{ave} + \Delta T_{max}$ with respect to the average transmission interval $PRI_{ave}$ of the pulse signal, the highest staggered ratio $J_{max}$ is given by $J_{max} = \Delta T_{max}/PRI_{ave} \times 100$. Note that, the staggered ratio J is generally given by $J = \Delta T/PRI_{ave} \times 100$ by using the staggered interval $\Delta T$.

The staggered pattern setting device 49 generates the setting signals St based on the highest staggered ratio $J_{max}$, the repetition frequency PRF, and the pulse width W, and outputs each setting signal St to the output signal generator 31.

Configuration of Staggered Pattern Setting Device 49

Figure 2:
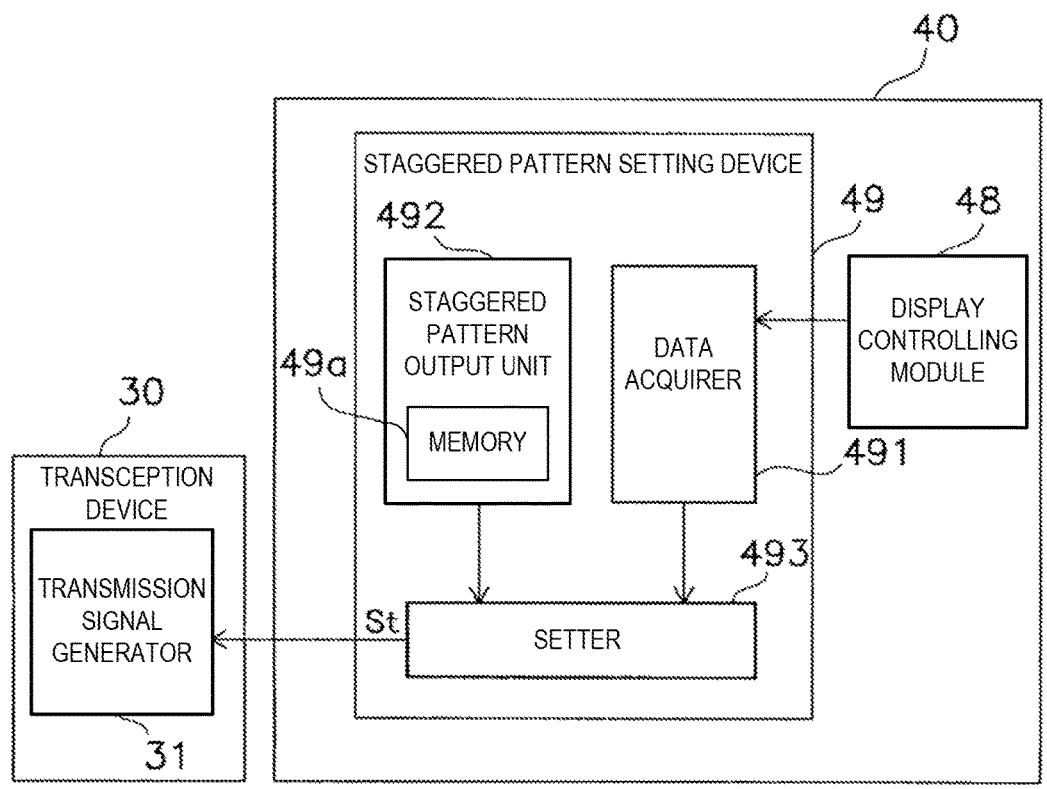
FIG. 2 is a block diagram illustrating a peripheral configuration of a staggered pattern setting device in FIG. 1.

As illustrated in FIG. 2, the staggered pattern setting device 49 includes a data acquirer 491, a staggered pattern output unit 492, and a setter 493. The data acquirer 491 acquires the input data indicating the highest staggered ratio $J_{max}$, the repetition frequency PRF, and the pulse width W, from the display controlling module 48. The highest staggered ratio $J_{max}$, the repetition frequency PRF, and the pulse width W are given to the setter 493 based on the acquired input data.

The staggered pattern output unit 492 is assigned with a memory 49a. In FIG. 2, an example in which the staggered pattern output unit 492 has the memory 49a therein is illustrated; however, the staggered pattern output unit 492 may have the memory 49a outside of the staggered pattern output unit 492. The memory 49a stores a plurality of staggered patterns. The staggered patterns stored in the memory 49a are described later in detail. The staggered pattern output unit 492 selects one staggered pattern from the plurality of staggered patterns stored in the memory 49a and outputs it to the setter 493.

Figure 3:
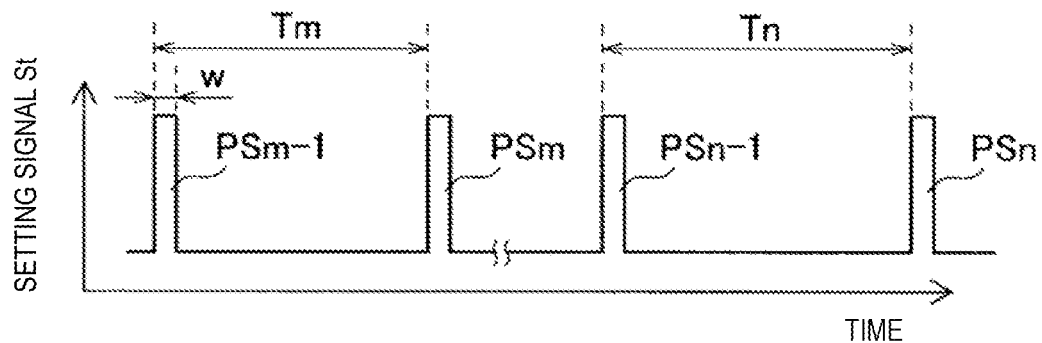
FIG. 3 is a timing chart for describing a setting signal of a transmission signal generator.

The setter 493 generates each setting signal St illustrated in FIG. 3 based on the highest staggered ratio $J_{max}$, the repetition frequency PRF, and the pulse width W acquired by the data acquirer 491 and the staggered patterns outputted from the staggered pattern output unit 492, and the setter 493 outputs the setting signal St to the signal generator 31. A transmission interval T of the setting signal St generally changes per pulse signal PS. In other words, in FIG. 3, a transmission interval $T_n$ between an (n−1)-th pulse signal $PS_{n-1}$ and an n-th pulse signal $PS_n$ is generally different from a transmission interval $T_m$ between an (m−1)-th pulse signal $PS_{m-1}$ and an m-th pulse signal $PS_m$. Note that, it is possible for two specific staggered intervals to be the same. The n-th transmission interval $\Delta T_n$ is expressed by $T_n = PRI_{ave} + \Delta T_n$ by using an n-th staggered interval $\Delta T_n$ and the average transmission interval $PRI_{ave}$.

Description of Staggered Pattern

Next, the staggered patterns outputted from the staggered pattern output unit 492 are described. FIGS. 4(A) to 4(D) illustrates an example of a conventional staggered pattern and an example of staggered patterns of this disclosure (example in which a predetermined number of sweeps is eight). For the staggered pattern illustrated in FIG. 4(A), numeral values from first to eighth items are set such that a total numeral value of cubes of the respective numeral values of the first to eighth items (each one of eight sweeps) becomes zero.

On the other hand, in the conventional staggered pattern illustrated in FIG. 4(B), a total numeral value of cubes of the respective numeral values of the first to eighth items does not become zero. In the example of FIG. 4(B), when the total numeral value of the cubes of the respective numeral values of the first to eighth items is obtained, the result becomes 108.

To illustrate a generalized staggered pattern of FIG. 4(A), it can be expressed as FIG. 4(C). In FIGS. 4(C) and 4(D), each small letter of alphabet indicates an absolute value of a real number. Note that, considering that data processing is performed by the signal processing device 40, it is preferable that each small letter of alphabet indicates a positive integer so as to reduce the data amount. A staggered pattern of which values are different from those in the corresponding items of the staggered pattern in FIG. 4(C), is illustrated in FIG. 4(D). As it can be understood by comparing FIG. 4(C) with FIG. 4(D), the lining order of the numeral values configuring the staggered pattern may be different.

FIG. 5 conceptually illustrates a procedure of creating a transmission interval pattern (PRI pattern) by using the staggered pattern illustrated in FIG. 4(A). The PRI pattern illustrated in FIG. 5 is created under a condition that the highest staggered ratio is 16% and a shortest staggered interval is 20 μs. By changing a non-staggered PRI pattern in FIG. 5 by a staggered interval pattern, the setting signals St for instructing a staggered PRI pattern in FIG. 5 are outputted from the staggered pattern outputting module 49 in FIG. 2. With the transception device 30, upon receiving the setting signals St of the staggered pattern outputting module 49, the transmission of the pulse signal PS is repeated at the transmission interval of the staggered PRI pattern in FIG. 5. The shortest staggered interval $\Delta T_{min}$ is expressed by the following equation.

$$\Delta T_{min} = PRI_{ave} \cdot \frac{J_{max}}{4}$$

Figure 6:
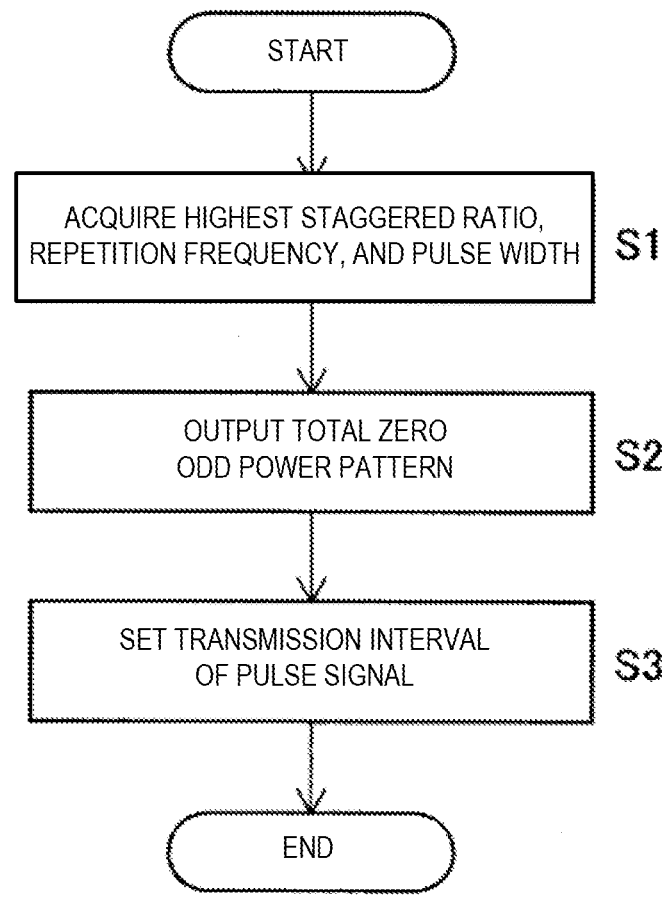
FIG. 6 is a flowchart illustrating a setting procedure of a transmission interval of a pulse signal.

A setting procedure using the staggered pattern as described above is briefly described by using FIG. 6. First, the data acquirer 491 of the staggered pattern setting device 49 acquires the data relating to the pulse width W, the repetition frequency PRF, and the highest staggered ratio $J_{max}$ (S1). Next, a staggered pattern in which an argument of a total value of $\exp(j\phi_m)$ becomes zero or can be approximated to zero is outputted (S2). The staggered pattern output unit 492 selects one staggered pattern from the memory 49a which stores a number of total zero odd power patterns, such as the ones illustrated in FIG. 4(A) and FIG. 4(B). Here, the total zero odd power pattern indicates a staggered pattern in which a total of odd powers of differences $\Delta T_m$ of the respective transmission intervals from the average transmission interval becomes zero within the sweep range (predetermined number of sweeps) with the processing data width $2K_p-1$ of the pulse pair method. Next, the setter 493 sets the transmission interval of the pulse signal by using the pulse width W, the repetition frequency PRF, and the highest staggered ratio $J_{max}$ given from the data acquirer 491 and the staggered pattern outputted from the staggered pattern output unit 492, and by outputting them to the transmission signal generator 31 (S3).

<Characteristics>

(1) As described above, with the staggered pattern of this embodiment, when the total numeral value of the cubes of differences $\Delta T_m$ of the respective transmission intervals (transmission intervals between set transmission timings) from the average transmission interval (predetermined repetition cycle of reference transmission timing) is obtained within the sweep range (in every predetermined number of sweeps) as the target of the pulse pairing, the result becomes zero. When this is expressed by mathematical expression, it becomes Equation 2.

$$\sum_{m=k-(K_p-1)}^{k+(K_p-1)} \Delta T_m^3 = 0 \qquad (2)$$

When the inside of $\arg[\bullet]$ is expressed by z in Equation 1, z is expressed by Equation 3. Note that, $\phi_{ave}$ expresses an average phase change amount of the reception signals from the target object in the sweep range (predetermined number of sweeps) as the target of the pulse pairing, and $\phi_m$ expresses a difference between an phase change amount of the reception signal from the target object corresponding to the m-th transmission interval (m is a natural number) and $\phi_{ave}$.

$$z = \sum_{m=k-(K_p-1)}^{k+(K_p-1)} S[m+1] \cdot S^*[m] = A^{2K_p-1} \cdot e^{j\phi_{ave}} \sum_{m=k-(K_p-1)}^{k+(K_p-1)} e^{j\phi_m} \qquad (3)$$

In a case where the staggered triggering is not used, $\phi_m$ in Equation 3 always becomes zero. Therefore, a phase error $\delta\phi$ caused by the staggering is given based on Equation 4.

$$\delta\phi = \arg\left[\sum_{m=k-(K_p-1)}^{k+(K_p-1)} e^{j\phi_m}\right] \qquad (4)$$

Equation 4 can be modified as the following equation.

$$\arg\left[\sum_{m=k-(K_p-1)}^{k+(K_p-1)} e^{j\phi_m}\right] = \tan^{-1}\frac{\alpha}{\beta} \qquad (5)$$

The numerator α on the right side of Equation 5 is given based on the following equation by performing the Taylor expansion with respect to $\exp(j\phi_m)$ with $\phi_m=0$, and substituting $\phi_m=2\pi f_d\Delta T_m$ therein. Note that, $f_d$ expresses a Doppler frequency corresponding to the speed of the target object.

$$\alpha = -\frac{1}{3!}(2\pi \cdot f_d)^3 \sum_{m=k-(K_p-1)}^{k+(K_p-1)} \Delta T_m^3 + \frac{1}{5!}(2\pi \cdot f_d)^5 \sum_{m=k-(K_p-1)}^{k+(K_p-1)} \Delta T_m^5 + \ldots =$$

$$\sum_{x=0}^{\infty}\left\{(-1)^x \frac{(2\pi \cdot f_d)^{2x+1}}{(2x+1)!} \sum_{m=k-(K_p-1)}^{k+(K_p-1)} \Delta T_m^3\right\}$$

When Equation 2 is satisfied, since α in Equation 5 becomes either one of zero and the value approximated to zero, the phase error $\delta\phi$ takes either one of zero and a value approximated to zero. Therefore, the value of the phase error $\delta\phi$ can be extremely small by using the staggered pattern satisfying Equation 2.

Obviously, even when Equation 2 is satisfied, there is a case where the result of Equation 5 does not become zero, such as a case where the staggered pattern is −2, −2, −2, −1, −1, −1, 3, 0. However, by satisfying Equation 2, the value of the phase error $\delta\phi$ can be smaller than the conventional art. To eliminate the phase error $\delta\phi$, a specific staggered pattern in which the right side of Equation 4, in other words, the argument of the total value of $\exp(j\phi_m)$, becomes zero, such as the pattern illustrated in FIG. 4(C) or FIG. 4(D), is used. Here, j expresses an imaginary unit, and $\phi_m$ expresses the difference between the phase change amount of the reflection signal from the target object corresponding to the m-th transmission internal (m is a natural number) and the average phase change amount of the reflection signal from the target object corresponding to the average transmission interval within the sweep range as the target of the pulse pairing.

In other words, the right side of Equation 4 is the total value of the phase changes of the respective reception signals within the sweep range (predetermined number of sweeps) as the target of the pulse pairing, each phase change caused by the pulse pairing on the target object at a constant speed due to the difference between the average transmission interval and the transmission interval between transmissions within the sweep range.

Therefore, by using the staggered pattern in which any total value of the odd powers of the respective differences ($\Delta T_m$) of the respective transmission intervals from the average transmission interval becomes zero, the argument of the total value of $\exp(j\phi_m)$ can be zero. Moreover, by using the staggered pattern in which the total value of the cubes of the respective differences ($\Delta T_m$) of the respective transmission intervals from the average transmission interval becomes zero, the argument of the total value of $\exp(j\phi_m)$ can be approximated to zero. Note that, the total value of the differences ($\Delta T_m$) of the respective transmission intervals from the average transmission interval always becomes zero regardless of the staggered pattern.

By using the staggered pattern in which the argument of the total value of $\exp(j\phi_m)$ can either become zero or be approximated to zero as above, the speed error caused by the staggering can be either one of zero and substantially zero.

Figure 7:
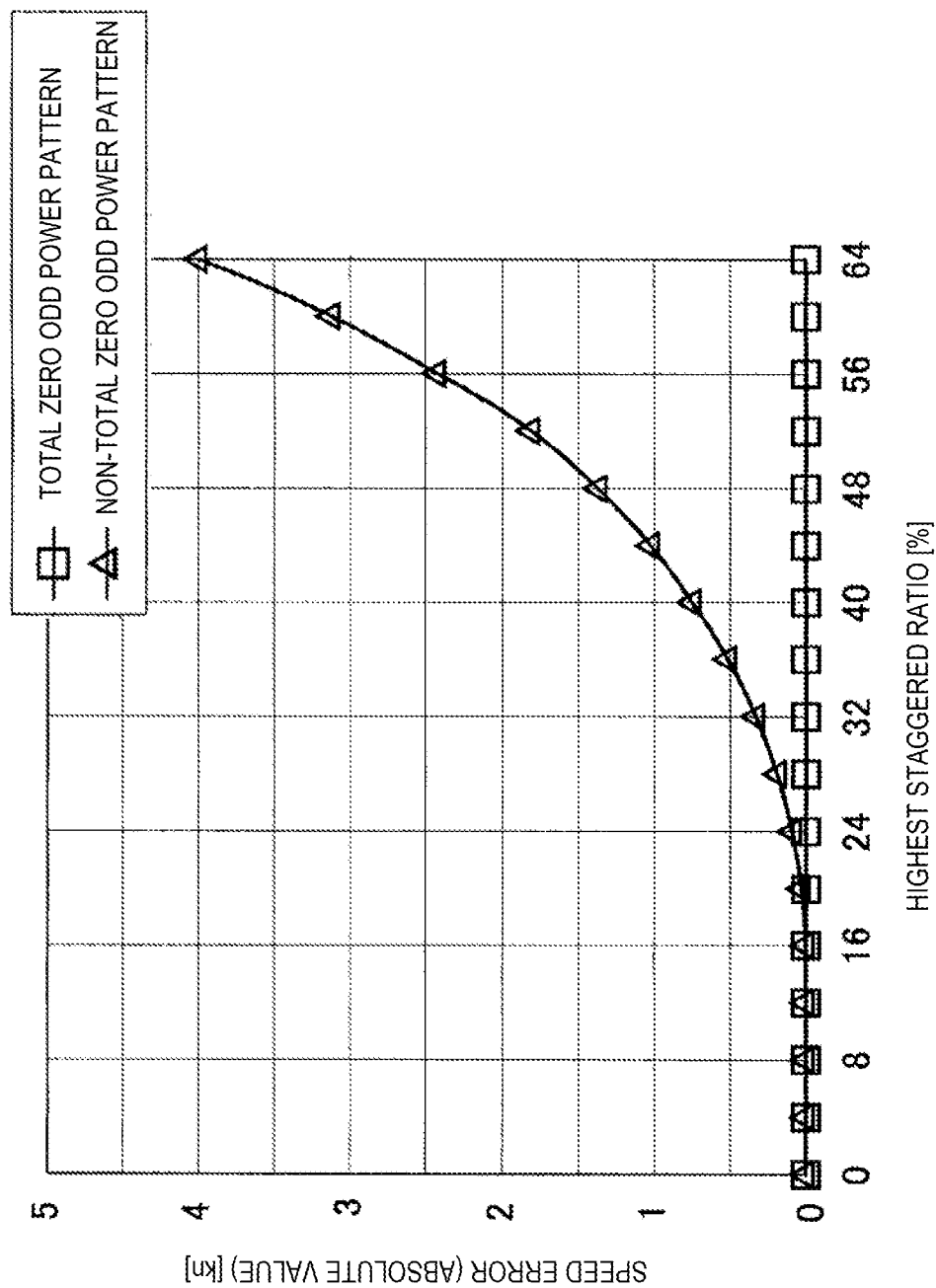
FIG. 7 is a chart illustrating a change of a speed error with respect to a highest staggered ratio.

FIG. 7 is a chart illustrating a change of the speed error with respect to the highest staggered ratio. The two curves in FIG. 7 illustrate a change when the total zero odd power pattern illustrated in FIG. 4(A) is used and a change when the non-total zero odd power pattern illustrated in FIG. 4(B) is used (the total value of the odd powers of the differences $\Delta T_m$ of the respective transmission intervals from the average transmission interval), respectively. Note that, the average transmission interval is 500 µs, the speed of the target object is 30 knot, and $K_p$ is 5.

In the non-total zero odd power pattern indicated by Δ in FIG. 7, the speed error increases as the highest staggered ratio increases. On the other hand, in the total zero odd power pattern indicated by □ in FIG. 7, the speed error with the highest staggered ratio of 64% or smaller becomes zero. Theoretically, in the total zero odd power pattern, the speed error with an arbitrary highest staggered ratio of 100% or smaller becomes zero.

Meanwhile, the staggered pattern setting device 49 corresponds to the pulse signal setting unit of Claim 1, the setter 493 corresponds to the setting module of Claim 1, each reference transmission timing described in Claim 1 corresponds to a timing at which the setting signal St is outputted when the non-staggered PRI pattern illustrated in FIG. 5 is inputted to the setter 493 from the staggered pattern output unit 492. On the other hand, each set transmission timing described in Claim 1 corresponds to a timing at which the setting signal St is outputted when the staggered PRI pattern illustrated in FIG. 5 is inputted to the setter 493 from the staggered pattern output unit 492. Therefore, when the phase change amounts of the pulse signals transmitted at the set transmission timings described in Claim 1 and the phase change amounts of the pulse signals transmitted at the reference transmission timings become substantially the same as each other for every predetermined number of sweeps, the value of the left term of Equation 2 described above takes either one of zero and a value approximated to zero.

The interval of the non-staggered PRI pattern in FIG. 5 is, for example, 500 µs, and this 500 µs corresponds to a predetermined repetition cycle. A predetermined period of time which the set transmission timing is different from 500 µs is each period of time of the intervals of the staggered interval pattern. For example, while an interval from the reference transmission timing of which PRI number is 1 to the reference transmission timing of which PRI number is 2 is 500 µs, an interval from the set transmission timing of which PRI number is 1 to the set transmission timing of which PRI number is 2 is 480 µs, and thus, they are different by 20 µs.

(2) As the staggered pattern in which the total value of the odd powers of the differences $\Delta T_m$ of the respective transmission intervals from the average transmission interval, as illustrated in FIGS. 4(C) and 4(D), a staggered pattern formed by using a plurality of pairs of real positive and negative numbers of which absolute values are different among the pairs (pair of −a and a, pair of −b and b, pair of −c and c, and pair of −d and d). In this case, the complicated calculation is not required and the formation of the staggered pattern becomes easy.

(3) By storing the staggered patterns in the memory 49a, the calculation of the staggered patterns can be omitted, and therefore, the responding speed of the staggered pattern output unit 492 can be increased.

<Modification 1-1>

A surveillance function can be added to the signal processing device 40 of the above embodiment. For this, a function to determine whether "an object with an approaching speed higher than a predetermined speed (e.g., 3 knots)" exists "within a distance of a predetermined value (e.g., 1.5 NM)" based on the speed data and the amplitude data, is added to the display controlling module 48 of the signal processing device 40. When the target object satisfying the above condition exists, for example, the display controlling module 48 issues a buzzer sound by controlling a buzzer of the display unit 50.

<Modification 1-2>

In the above embodiment, the case where the data acquiring module 46a directly acquires the data of the highest staggered ratio $J_{max}$, the repetition frequency PRF, and the pulse width W is described; however, the data to be acquired by the data acquiring module 46a may be data with which the highest staggered ratio $J_{max}$, the repetition frequency PRF, and the pulse width W can be acknowledged indirectly. For example, a configuration in which the data acquiring module 46a calculates the highest staggered ratio $J_{max}$, the repetition frequency PRF, and the pulse width W through acquiring the distance range measured by the radar apparatus 10, the range, and the like, may be adopted. The data relating to the highest staggered ratio $J_{max}$, the repetition frequency PRF, and the pulse width W may be data including information regarding the highest staggered ratio $J_{max}$, the repetition frequency PRF, and the pulse width W.

<Modification 1-3>

In the above embodiment, the method using the Taylor expansion to set the argument of the total value of $\exp(j\phi_m)$ to be approximated to zero is described; however, a method using other than the Taylor expansion may be used.

<Modification 1-4>

With the radar apparatus 10 of the above embodiment, the case where the staggered pattern setting device 49 is configured as hardware is described; however, the functions of the data acquirer 491, the staggered pattern output unit 492, and the setter 493 of the staggered pattern setting device 49 may be achieved by software. In this case, a control device, such as a CPU, upon reading a program from a memory medium of, for example a ROM, achieves the functions of the data acquirer 491, the staggered pattern output unit 492, and the setter 493 of the staggered pattern setting device 49.

Second Embodiment

Figure 8:
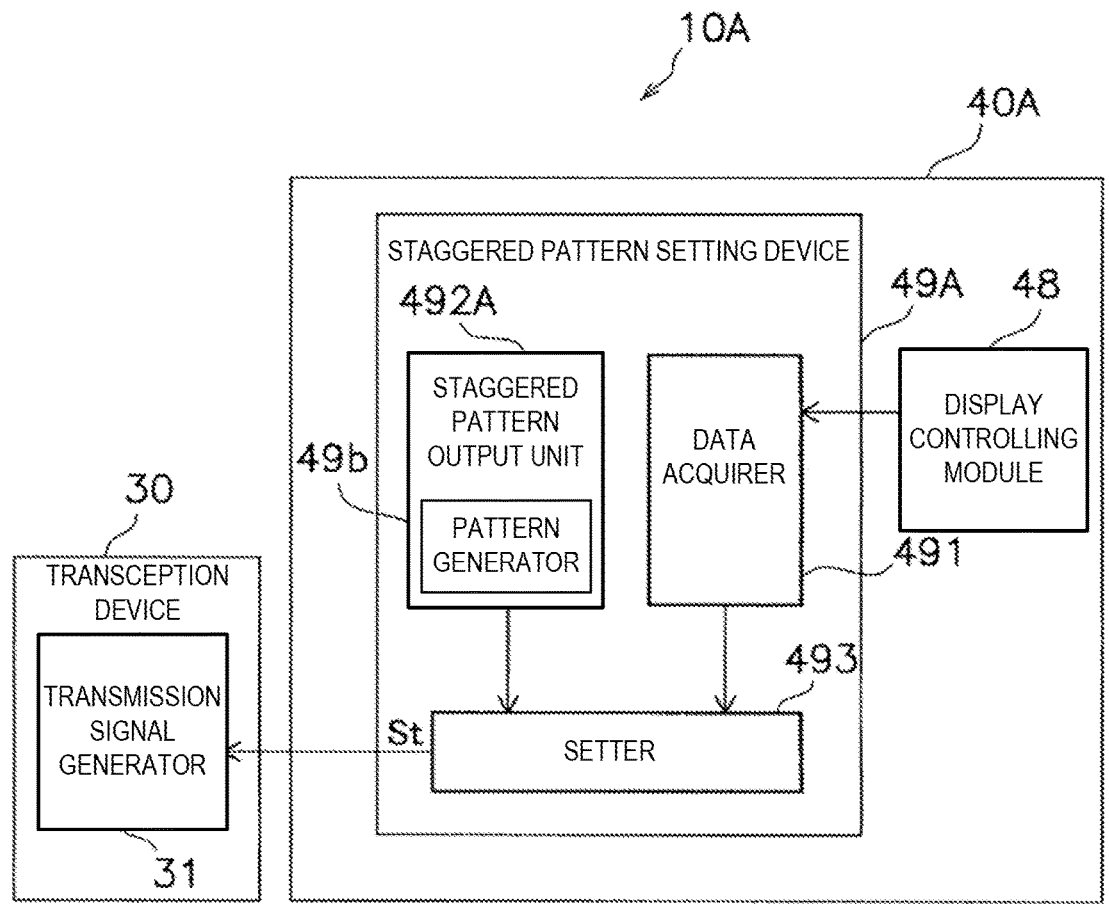
FIG. 8 is a block diagram illustrating a peripheral configuration of a staggered pattern setting device according to a second embodiment.

Hereinafter, a radar apparatus according to a second embodiment of this disclosure is described with reference to the drawings. FIG. 8 is a block diagram illustrating a peripheral configuration of a staggered pattern setting device of the ship apparatus according to the second embodiment. As illustrated in FIG. 8, a staggered pattern setting device 49A of a ship radar apparatus 10A includes a data acquirer 491, a staggered pattern output unit 492A, and a setter 493.

The difference of the configuration of the ship radar apparatus of the second embodiment from the configuration of the ship radar apparatus of the first embodiment is the configuration of the staggered pattern output unit 492A. The staggered pattern output unit 492 of the first embodiment is assigned with the memory 49a and the plurality of kinds of staggered patterns are stored in advance. On the other hand, the staggered pattern output unit 492A of the second embodiment includes a pattern generator 49b configured to generate the staggered pattern. As illustrated in, for example, FIG. 4(C), the pattern generator 49b generates pairs of integers of which absolute values are the same in each pair. The absolute values of each pair generated by the pattern generator 49b are set to increase, for example, one by one. Once the pattern generator 49b generates a predetermined number of pairs of integers, the staggered pattern output unit 492A generates a random number among the pairs to switch the order of the respective integers. Thus, the staggered pattern output unit 492A can output an arbitrary pattern among the plurality of kinds of staggered patterns every time.

The description of the configuration of the signal processing device 40A of the radar apparatus 10A of the second embodiment other than the staggered pattern setting device 49A is omitted since it can be configured the same as the configuration of the signal processing device 40 of the radar apparatus 10 of the first embodiment other than the staggered pattern setting device 49.

<Characteristics>

In the second embodiment, since the staggered patterns are generated by the pattern generator 49b, the kinds of the staggered patterns which can be outputted from the staggered pattern output unit 492A can be increased, and the possibility of interference can be reduced to extremely low even in a crowded area with ships.

Note that, except for the effect caused by the difference between the memory 49a and the pattern generator 49b, the radar apparatus 10A of the second embodiment can also exert similar effects to the radar apparatus 10 of the first embodiment.

<Modification 2-1>

With the radar apparatus 10A of the above embodiment, the case where the staggered pattern setting device 49A is configured as hardware is described; however, the functions of the data acquirer 491, the staggered pattern output unit 492A, and the setter 493 of the staggered pattern setting device 49A may be achieved by software. In this case, a control device, such as a CPU, upon reading a program from a memory medium of, for example a ROM, achieves the functions of the data acquirer 491, the staggered pattern output unit 492A, and the setter 493 of the staggered pattern setting device 49A.

DESCRIPTION OF REFERENCE NUMERAL(S)

10, 10A Radar Apparatus
20 Antenna
30 Transception Device
31 Transmission Signal Generator
40, 40A Signal Processing Device
49, 49A Staggered Pattern Setting Device
50 Display Unit

REFERENCE DOCUMENT(S) OF CONVENTIONAL ART

Patent Document(s)

Patent Document 1: JP3561497B

What is claimed is:

1. A pulse signal setting unit to be applied for a radar apparatus that performs pulse pairing on complex reception signals by calculating phase change amounts of transmitted pulse signals for every predetermined number of sweeps, each complex reception signal obtained from a reflection wave caused by a transmitted pulse signal and reflected on a target object, the pulse signal setting unit comprising:

a setting module configured to set a plurality of set transmission timings and receive a plurality of reference transmission timings, wherein each set transmission timing is different, by a predetermined period of time, from a corresponding reference transmission timing having a predetermined repetition cycle, wherein a pulse signal is transmitted at each set transmission timing and each reference transmission timing, and wherein the setting module:

sets the plurality of set transmission timings to cause the phase change amount of the pulse signal transmitted at each set transmission timing to be substantially the same as the phase change amount of the pulse signal transmitted at the corresponding reference transmission timing, for every predetermined number of sweeps;

includes a staggered pattern output module configured to generate a specific staggered pattern to eliminate a phase error for every predetermined number of sweeps, the specific staggered pattern being a combination of the plurality of set transmission timings; and sets the plurality of set transmission timings based on the specific staggered pattern.

2. The pulse signal setting unit of claim 1, wherein the staggered pattern output module generates the specific staggered pattern to cause a total value of the phase error for every predetermined number of sweeps to become substantially zero.

3. The pulse signal setting unit of claim 1, wherein the staggered pattern output module outputs a specific staggered pattern in which an argument of a total value of $\exp(j\phi m)$ for every predetermined number of sweeps becomes substantially zero, "j" indicating an imaginary unit and $\phi m$ indicating a difference between the phase change amount of a complex reception signal corresponding to an m-th set transmission timing (m is a natural number) and an average phase change amount of the complex reception signals in the predetermined number of sweeps.

4. The pulse signal setting unit of claim 2, wherein the staggered pattern output module outputs a specific staggered pattern in which a total value of cubes of differences of respective transmission intervals between the set transmission timings from the predetermined repetition cycle becomes zero.

5. The pulse signal setting unit of claim 4, wherein the staggered pattern output module outputs a specific staggered pattern formed by using a plurality of pairs of real positive and negative numbers, absolute values of the real positive and negative numbers of each pair are the same as each other.

6. The pulse signal setting unit of claim 1, wherein the staggered pattern output module includes:

a memory configured to store a plurality of specific staggered patterns; and a selecting module configured to select one of the plurality of specific staggered patterns stored in the memory.

7. The pulse signal setting unit of claim 1, wherein the staggered pattern output module includes a pattern generating module configured to generate a transmission timing pattern meeting a condition of the specific staggered pattern, and the staggered pattern output module outputs a random staggered pattern based on the transmission timing pattern generated by the pattern generating module.

8. A radar apparatus, comprising:
a transception device configured to output complex reception signals obtained from reflection waves caused by transmitted pulse signals and reflected on a target object; and
a signal processing device including the pulse signal setting unit of claim 1 configured to set the pulse signals transmitted by the transception device, and configured to perform pulse pairing on the complex reception signals outputted by the transception device and estimate a relative speed of the target object.

9. A method of setting pulse signals, to be applied for a radar apparatus that performs pulse pairing on complex reception signals by calculating phase change amounts of transmitted pulse signals for every predetermined number of sweeps, each complex reception signal obtained from a reflection wave caused by a transmitted pulse signal and reflected on a target object, the method comprising:
setting a plurality of set transmission timings and receive a plurality of reference transmission timings, wherein each set transmission timing is different, by a predetermined period of time, from a corresponding reference transmission timing having a predetermined repetition cycle,
wherein a pulse signal is transmitted at each set transmission timing and each reference transmission timing, and
wherein the setting the plurality of set transmission timings includes:
setting the plurality of set transmission timings to cause the phase change amount of the pulse signal transmitted at each set transmission timing to be substantially the same as the phase change amount of the pulse signal transmitted at the corresponding reference transmission timing for every predetermined number of sweeps;
generating a specific staggered pattern to eliminate a phase error for every predetermined number of sweeps, the specific staggered pattern being a combination of the plurality of set transmission timings; and
setting the plurality of set transmission timings based on the specific staggered pattern.

10. A pulse signal setting unit to be applied for a radar apparatus that performs pulse pairing on complex reception signals for every predetermined number of sweeps, each complex reception signal obtained from a reflection wave caused by a transmitted pulse signal and reflected on a target object, the pulse signal setting unit comprising:
a setting module configured to receive a reference transmission timing having a predetermined repetition cycle and set a plurality of set transmission timings, each set transmission timing different from the reference transmission timing by a predetermined period of time,
wherein the setting module includes a staggered pattern output module configured to generate a specific staggered pattern to eliminate a phase error for every predetermined number of sweeps, the specific staggered pattern being a combination of the plurality of set transmission timings,
wherein the setting module sets the plurality of set transmission timings based on the specific staggered pattern,
wherein a pulse signal is transmitted at each set transmission timing and each reference transmission timing, and
wherein the predetermined period of time is a period of time with which a phase change amount of the pulse signal transmitted at each set transmission timing in the predetermined number of sweeps is substantially the same as a phase change amount of the pulse signal transmitted at the corresponding reference transmission timing in the predetermined number of sweeps.

11. The pulse signal setting unit of claim 10, wherein the staggered pattern output module generates the specific staggered pattern to cause a total value of the phase error for every predetermined number of sweeps to become substantially zero.

12. The pulse signal setting unit of claim 10, wherein the staggered pattern output module outputs a specific staggered pattern in which an argument of a total value of $\exp(j\phi m)$ for every predetermined number of sweeps becomes substantially zero, "j" indicating an imaginary unit and $\phi m$ indicating a difference between the phase change amount of a complex reception signal corresponding to an m-th set transmission timing (m is a natural number) and an average phase change amount of the complex reception signals in the predetermined number of sweeps.

13. The pulse signal setting unit of claim 11, wherein the staggered pattern output module outputs a specific staggered pattern in which a total value of cubes of differences of respective transmission intervals between the set transmission timings from the predetermined repetition cycle becomes zero.

14. The pulse signal setting unit of claim 13, wherein the staggered pattern output module outputs a specific staggered pattern formed by using a plurality of pairs of real positive and negative numbers, absolute values of the real positive and negative numbers of each pair are the same as each other.

15. The pulse signal setting unit of claim 10, wherein the staggered pattern output module includes:
a memory configured to store a plurality of specific staggered patterns; and
a selecting module configured to select one of the plurality of specific staggered patterns stored in the memory.

16. The pulse signal setting unit of claim 10, wherein the staggered pattern output module includes a pattern generating module configured to generate a transmission timing pattern meeting a condition of the specific staggered pattern, and the staggered pattern output module outputs a random staggered pattern based on the transmission timing pattern generated by the pattern generating module.

17. A radar apparatus, comprising:
a transception device configured to output complex reception signals obtained from reflection waves caused by transmitted pulse signals and reflected on a target object; and
a signal processing device including the pulse signal setting unit of claim 10 configured to set the pulse signals transmitted by the transception device, and configured to perform pulse pairing on the complex reception signals outputted by the transception device and estimate a relative speed of the target object.

18. The pulse signal setting unit of claim 3, wherein the staggered pattern output module outputs a specific staggered pattern in which a total value of cubes of differences of respective transmission intervals between the set transmission timings from the predetermined repetition cycle becomes zero.

19. The pulse signal setting unit of claim 18, wherein the staggered pattern output module outputs a specific staggered pattern formed by using a plurality of pairs of real positive and negative numbers, absolute values of the real positive and negative numbers of each pair are the same as each other.

20. The pulse signal setting unit of claim 12, wherein the staggered pattern output module outputs a specific staggered pattern in which a total value of cubes of differences of respective transmission intervals between the set transmission timings from the predetermined repetition cycle becomes zero.

* * * * *